(12) United States Patent
Chambers et al.

(10) Patent No.: US 8,717,223 B2
(45) Date of Patent: May 6, 2014

(54) CLASSIFICATION OF SUBSURFACE OBJECTS USING SINGULAR VALUES DERIVED FROM SIGNAL FRAMES

(75) Inventors: David H. Chambers, Livermore, CA (US); David W. Paglieroni, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 339 days.

(21) Appl. No.: 13/219,435

(22) Filed: Aug. 26, 2011

(65) Prior Publication Data

US 2013/0082858 A1   Apr. 4, 2013

Related U.S. Application Data

(60) Provisional application No. 61/377,319, filed on Aug. 26, 2010, provisional application No. 61/377,324, filed on Aug. 26, 2010.

(51) Int. Cl.
    *G01S 13/00* (2006.01)
(52) U.S. Cl.
    USPC ............... 342/22; 342/27; 342/25 R; 342/191
(58) Field of Classification Search
    USPC ..................... 342/22, 25 R–25 F, 27, 191
    See application file for complete search history.

(56) References Cited

U.S. PATENT DOCUMENTS

| | | | |
|---|---|---|---|
| 5,796,363 A | 8/1998 | Mast | |
| 5,835,054 A | 11/1998 | Warhus et al. | |
| 6,222,481 B1 * | 4/2001 | Abrahamson et al. | 342/90 |
| 6,243,036 B1 * | 6/2001 | Chadwick et al. | 342/27 |
| 6,982,666 B2 * | 1/2006 | Temes et al. | 342/22 |
| 7,359,782 B2 * | 4/2008 | Breed | 701/45 |
| 7,382,312 B2 * | 6/2008 | Hintz | 342/90 |
| 2004/0155810 A1 * | 8/2004 | Witten | 342/22 |
| 2005/0100209 A1 * | 5/2005 | Lewis et al. | 382/159 |
| 2006/0087471 A1 * | 4/2006 | Hintz | 342/22 |
| 2007/0024489 A1 * | 2/2007 | Cerwin | 342/22 |
| 2007/0188371 A1 | 8/2007 | Callison | |
| 2013/0082856 A1 | 4/2013 | Paglieroni et al. | |
| 2013/0082857 A1 | 4/2013 | Beer et al. | |
| 2013/0082859 A1 | 4/2013 | Paglieroni et al. | |
| 2013/0082860 A1 | 4/2013 | Paglieroni et al. | |
| 2013/0082861 A1 | 4/2013 | Paglieroni et al. | |

(Continued)

OTHER PUBLICATIONS

U.S. Appl. No. 13/219,504, filed Aug. 26, 2011, Chambers et al.

(Continued)

*Primary Examiner* — John B Sotomayor
*Assistant Examiner* — Marcus Windrich
(74) *Attorney, Agent, or Firm* — Perkins Coie LLP (57) ABSTRACT

The classification system represents a detected object with a feature vector derived from the return signals acquired by an array of N transceivers operating in multistatic mode. The classification system generates the feature vector by transforming the real-valued return signals into complex-valued spectra, using, for example, a Fast Fourier Transform. The classification system then generates a feature vector of singular values for each user-designated spectral sub-band by applying a singular value decomposition (SVD) to the N×N square complex-valued matrix formed from sub-band samples associated with all possible transmitter-receiver pairs. The resulting feature vector of singular values may be transformed into a feature vector of singular value likelihoods and then subjected to a multi-category linear or neural network classifier for object classification.

17 Claims, 10 Drawing Sheets

(56) References Cited

U.S. PATENT DOCUMENTS

| | | |
|---|---|---|
| 2013/0082862 A1 | 4/2013 | Paglieroni et al. |
| 2013/0082863 A1 | 4/2013 | Paglieroni et al. |
| 2013/0082864 A1 | 4/2013 | Paglieroni et al. |
| 2013/0082870 A1 | 4/2013 | Chambers et al. |
| 2013/0085982 A1 | 4/2013 | Paglieroni et al. |

OTHER PUBLICATIONS

Aliferis, I. et al., "Comparison of the diffraction stack and time-reversal imaging algorithms applied to short-range UWB scattering data," *Proc. IEEE Int. Conf. Ultra-Wideband*, Singapore, pp. 618-621, 2007.

Ammari, H. et al., "MUSIC-type electromagnetic imaging of a collection of small three-dimensional inclusions," *SIAM J. Sci. Comput.*, vol. 29, No. 2, pp. 674-709, 2007.

Ammari, H. et al., "A MUSIC algorithm for locating small inclusions buried in a half-space from the scattering amplitude at a fixed frequency," *Multiscale Model. Simul.*, vol. 3, No. 3, pp. 597-628, 2005.

Beer, N.R. et al., "Computational system for detecting buried objects in subsurface tomography images reconstructed from multistatic ultra wideband ground penetrating radar data," *LLNL-12311*, pp. 1-11, 2010.

Belkebir, K., Bonnard, S. et al., "Validation of 2D inverse scattering algorithms from multi-frequency experimental data," *J. Electromag. Waves App.*, vol. 14:1637-1667, 2000.

Bellomo, L. et al., "Time reversal experiments in the microwave range: description of the radar and results," *Prog. Electromag. Res.*, vol. 104, pp. 427-448, 2010.

Chambers, D.H., "Target characterization using time-reversal symmetry of wave propagation," *Int. J. Mod. Phys. B*, vol. 21, No. 20, pp. 3511-3555, 2007.

Chambers, D.H. and J.G. Berryman, "Analysis of the time-reversal operator for a small spherical scatterer in an electromagnetic field," *IEEE Trans. Ant. Prop.*, vol. 52, No. 7, pp. 1729-1738, 2004.

Chambers, D.H. and J.G. Berryman, "Target characterization using decomposition of the time-reversal operator: electromagnetic scattering from small ellipsoids," *Inv. Prob.*, vol. 22, pp. 2145-2163, 2006.

Chambers, D.H. and J.G. Berryman, "Time-reversal analysis for scatterer characterization," *Phys. Rev. Lett.*, vol. 92, No. 2, pp. 023902-1-023902-4, 2004.

Chan, K.P. and Y.S. Cheung, "Fuzzy-attribute graph with application to chinese character recognition," *IEEE Transactions on Systems, Man, and Cybernetics*, vol. 22, No. 1:153-160, Jan./Feb. 1992.

Chatelée, V. et al., "Real data microwave imaging and time reversal," *IEEE APS Int. Symp.*, pp. 1793-1796, 2007.

Chauveau, J. et al., "Determination of resonance poles of radar targets in narrow frequency bands," *Proc. 4th Euro. Radar Conf.*, Munich, pp. 122-125, 2007.

Cmielewski, O. et al., "A two-step procedure for characterizing obstacles under a rough surface from bistatic measurements," *IEEE Trans. Geos. Rem. Sens.*, vol. 45, No. 9, pp. 2850-2858, 2007.

Counts, T. et al., "Multistatic ground-penetrating radar experiments," *IEEE Trans. Geos. Rem. Sens.*, vol. 45, No. 8, pp. 2544-2553, 2007.

Cresp, A. et al., "Investigation of time-reversal processing for surface-penetrating radar detection in a multiple-target configuration," *Proc. 5th Euro. Radar Conf.*, Amsterdam, pp. 144-147, 2008.

Cresp, A. et al., "Time-domain processing of electromagnetic data for multiple-target detection," *Conf. Math. Mod. Wave Phen.*, pp. 204-213, 2009.

Cresp, A. et al., "Comparison of the time-reversal and SEABED imaging algorithms applied on ultra-wideband experimental SAR data," *Proc. 7th Euro. Radar Conf.*, Paris, pp. 360-363, 2010.

Daniels, D.J., "Ground penetrating radar for buried landmine and IED detection," *Unexploded Ordnance Detection and Mitigation*, J. Byrnes (ed.), Springer, pp. 89-111, 2009.

Daniels, D.J., "A review of GPR for landmine detection," *Int. J. Sens. Imag.*, vol. 7, No. 3, pp. 90-123, 2006.

Daniels, D.J., "An assessment of the fundamental performance of GPR against buried landmines," *Detection and Remediation Technologies for Mines and Minelike Targets XII, Proc. SPIE*, vol. 6553, pp. 65530G-1-65530G-15, 2007.

Daniels, D.J. et al., "Classification of landmines using GPR," *IEEE Radar '08, Proceedings*, pp. 1-6, 2008.

Devaney, A.J., "Time reversal imaging of obscured targets from multistatic data," *IEEE Trans. Ant. Prop.*, vol. 53, No. 5, pp. 1600-1619, May 2005.

Dubois, A. et al., "Localization and characterization of two-dimensional targets buried in a cluttered environment," *Inv. Prob.*, vol. 20, pp. S63-S79, 2004.

Dubois, A. et al., "Retrieval of inhomogeneous targets from experimental frequency diversity data," *Inv. Prob.*, vol. 21, pp. S65-S79, 2005.

Dubois, A. et al., "Imaging of dielectric cylinders from experimental stepped frequency data," *Appl. Phys. Lett.*, vol. 88, pp. 64104-1-164104-3, 2006.

Feng, X. and M. Sato, "Pre-stack migration applied to GPR for landmine detection," *Inv. Prob.*, vol. 20, pp. S99-S115, 2004.

Fink, M. et al., "Time-reversed acoustics," *Rep. Prog. Phys.*, vol. 63:1933-1995, 2000.

Fink, M. and C. Prada, "Acoustic time-reversal mirrors," *Inv. Prob.*, vol. 17, pp. R1-R38, 2001.

Gader, P. et al., "Detecting landmines with ground-penetrating radar using feature-based rules, order statistics, and adaptive whitening," *Trans. Geos. Rem. Sens.*, vol. 42, No. 11, pp. 2522-2534, 2004.

Gaunaurd, G.C. and L.H. Nguyen, "Detection of land-mines using ultra-wideband radar data and time-frequency signal analysis," *IEE Proc. Radar Sonar Navig.*, vol. 151, No. 5, pp. 307-316, 2004.

Gilmore, C. et al., "Derivation and comparison of SAR and frequency-wavenumber migration within a common inverse scalar wave problem formulation," *IEEE Trans. Geos. Rem. Sens.*, vol. 44, No. 6, pp. 1454-1461, 2006.

Grove, A.J. et al., "General convergence results for linear discriminant updates," *Proc. COLT 97*, ACM press, pp. 171-183, 1997.

Iakovleva, E. et al., "Multistatic response matrix of a 3-D inclusion in half space and MUSIC imaging," *IEEE Trans. Ant. Prop.*, vol. 55, pp. 2598-2607, 2007.

Iakovleva, E. and D. Lesselier, "Multistatic response matrix of spherical scatterers and the back propagation of singular fields," *IEEE Trans. Ant. Prop.*, vol. 56, No. 3, pp. 825-833, 2008.

Jofre, L. et al., "UWB tomographic radar imaging of penetrable and impenetrable objects," *Proc. IEEE*, vol. 97, No. 2, pp. 451-464, 2009.

Kuhn, H.W., "The Hungarian method for the assignment problem," *Naval Research Logistics Quarterly*, 2:83-97, 1955.

Lee, W-H. et al., "Optimizing the area under a receiver operating characteristic curve with application to landmine detection," *IEEE Trans. Geos. Rem. Sens.*, vol. 45, No. 2, pp. 389-397, 2007.

Mast, J.E. and E.M. Johansson, "Three-dimensional ground penetrating radar imaging using multi-frequency diffraction tomography," *SPIE*, vol. 2275, pp. 196-204, 1994.

Johansson, E.M. and J. Mast, "Three-dimensional ground penetrating radar imaging using synthetic aperture time-domain focusing," *SPIE*, vol. 2275, pp. 205-214, 1994.

Micolau, G. and M. Saillard, "DORT method as applied to electromagnetic subsurface imaging," *Radio Sci.*, vol. 38, No. 3, 1038, pp. 4-1-4-12, 2003.

Micolau, G. et al., "DORT method as applied to ultrawideband signals for detection of buried objects," *IEEE Trans. Geos. Rem. Sens.*, vol. 41, No. 8, pp. 1813-1820, 2003.

Paglieroni, D. and F. Nekoogar, "Matching random tree models of spatio-temporal patterns to tables or graphs," *IEEE Symposium on Computational Intelligence and Data Mining*, pp. 1-8, Apr. 1-5, 2007.

Paglieroni, D., and K. Ni, "DART Queries," *IEEE Transactions on Knowledge and Data Engineering, in Revision*, LLNL-JRNL-418760, 2010.

Paglieroni, D.W. et al., "DART-based threat assessment for buried objects Detected with a ground penetrating radar over time," LLNL, pp. 1-7, 2010.

(56) References Cited

OTHER PUBLICATIONS

Prada, C. and M. Fink, "Eigenmodes of the time reversal operator: A solution to selective focusing in multiple-target media," *Wave Motion*, vol. 20, pp. 151-163, 1994.

Saillard, M. et al., "Reconstruction of buried objects surrounded by small inhomogeneities," *Inv. Prob.*, vol. 16, pp. 1195-1208, 2000.

Soumekh, M. et al., "3D wavefront image formation for NIITEK GPR," *Radar Sensor Technology XIII Proc. SPIE*, vol. 7308, pp. 73080J-1-73080J-12, 2009.

Throckmorton, C. et al., "The efficacy of human observation for discrimination and feature identification of targets measured by the NIITEK ground penetrating radar," *Detection and Remediation Technologies for Mines and Minelike Targets IX, Proc. SPIE*, vol. 5415, pp. 963-972, 2004.

Torrione, P.A. et al., "Performance of an adaptive feature-based processor for a wideband ground penetrating radar system," *IEEE Trans. Aerospace Elec. Systems*, pp. 1-10, 2006.

Torrione, P.A. and L.M. Collins, "Texture features for antitank landmine detection using ground penetrating radar," *IEEE Trans. Geos. Rem. Sens.*, vol. 45, No. 7, pp. 2374-2382, 2007.

Torrione, P.A. et al., "Constrained filter optimization for subsurface landmine detection," *Detection and Remediation Technologies for Mines and Minelike Targets XI, Proc. SPIE*, vol. 6217, pp. 621710X-1-621710X-12, 2006.

Torrione, P.A., Collins, L. et al., "Application of the LMS algorithm to anomaly detection using the Wichmann/NIITEK ground penetrating radar," *Detection and Remediation Technologies for Mines and Minelike Targets VIII, Proc. SPIE*, vol. 5089, pp. 1127-1136, 2003.

Tortel, H. et al., "Decomposition of the time reversal operator for electromagnetic scattering," *J. Electromag. Waves. App.*, vol. 13, pp. 687-719, 1999.

Tsai, W-H and K-S Fu, Error-Correcting Isomorphisms of Attributed Relational Graphs for Pattern Analysis, *IEEE Transactions on Systems, Man, and Cybernetics*, vol. 9, No. 12, pp. 757-768, 1979.

Vitebskiy, S., Carin, L., "Resonances of perfectly conducting wires and bodies of revolution buried in a lossy dispersive half-space," *IEEE Trans. Ant. Prop.*, vol. 44, No. 12, pp. 1575-1583, 1996.

Vitebskiy, S. et al., "Short-pulse plane-wave scattering from buried perfectly conducting bodies of revolution," *IEEE Trans. Ant. Prop.*, vol. 44, No. 2, pp. 143-151, 1996.

Wilson, J.N. et al., "A large-scale systematic evaluation of algorithms using ground-penetrating radar for landmine detection and discrimination," *IEEE Trans. Geos. Rem. Sens.*, vol. 45, No. 8, pp. 2560-2572, 2007.

Yavuz, M.E. and F.L. Teixeira, "Full time-domain DORT for ultrawideband electromagnetic fields in dispersive, random inhomogeneous media," *IEEE Trans. Ant. Prop.*, vol. 54, No. 8, pp. 2305-2315, 2006.

Yavuz, M.E. and F.L. Teixeira, "On the sensitivity of time-reversal imaging techniques to model perturbations," *IEEE Trans. Ant. Prop.*, vol. 56, No. 3, pp. 834-843, 2008.

Yavuz, M.E. and F.L. Teixeira, "Space-frequency ultrawideband time-reversal imaging," *IEEE Trans. Geos. Rem. Sens.*, vol. 46, No. 4, pp. 1115-1124, 2008.

Zhu, Q. and L.M. Collins, "Application of feature extraction methods for landmine detection using the Wichmann/NIITEK ground-penetrating radar," *IEEE Trans. Geos. Rem. Sens.*, vol. 43, No. 1, pp. 81-85, 2005.

Zhuge, X. et al., "UWB array-based radar imaging using modified Kirchhoff migration," *Proc. 2008 IEEE Conf. Ultra-Wideband*, vol. 3, pp. 175-178, 2008.

\* cited by examiner

FIG. 10

# CLASSIFICATION OF SUBSURFACE OBJECTS USING SINGULAR VALUES DERIVED FROM SIGNAL FRAMES

CROSS-REFERENCE TO RELATED APPLICATION(S)

This application claims the benefit of U.S. Provisional Patent Application No. 61/377,319 filed Aug. 26, 2010, entitled "COMPUTATIONAL SYSTEM FOR DETECTING BURIED OBJECTS IN SUBSURFACE TOMOGRAPHY IMAGES RECONSTRUCTED FROM MULTISTATIC ULTRA WIDEBAND GROUND PENETRATING RADAR DATA," and U.S. Provisional Patent Application No. 61/377,324, filed Aug. 26, 2010, entitled "DART-BASED THREAT ASSESSMENT FOR BURIED OBJECTS DETECTED WITH A GROUND PENETRATING RADAR OVER TIME," which are incorporated herein by reference in their entirety.

This application is related to U.S. patent application Ser. No. 13/219,410, filed Aug. 26, 2011, entitled "REAL-TIME SYSTEM FOR IMAGING AND OBJECT DETECTION WITH A MULTISTATIC GPR ARRAY," U.S. patent application Ser. No. 13/219,425, filed Aug. 26, 2011, entitled "ATTRIBUTE AND TOPOLOGY BASED CHANGE DETECTION IN A CONSTELLATION OF PREVIOUSLY DETECTED OBJECTS," and U.S. patent application Ser. No. 13/219,430, filed Aug. 26, 2011, entitled "DISTRIBUTED ROAD ASSESSMENT SYSTEM," which are incorporated herein by reference in their entirety.

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Many scientific, engineering, medical, and other technologies seek to identify the presence of an object within a medium. For example, some technologies detect the presence of buried landmines in a roadway or a field for military or humanitarian purposes. Such technologies may use ultra wideband ground-penetrating radar ("GPR") antennas that are mounted on the front of a vehicle that travels on the roadway or across the field. The antennas are directed into the ground with the soil being the medium and the top of the soil or pavement being the surface. GPR systems can be used to detect not only metallic objects but also non-metallic objects whose dielectric properties are sufficiently different from those of the soil. When a radar signal strikes a subsurface object, it is reflected back as a return signal to a receiver. Current GPR systems typically analyze the strength or amplitude of the return signals directly to identify the presence of the object. Some GPR systems may, however, generate tomography images from the return signals. In the medical field, computer-assisted tomography uses X-rays to generate tomography images for detecting the presence of abnormalities (i.e., subsurface objects) within a body. In the engineering field, GPR systems have been designed to generate spatial images of the interior of concrete structures such as bridges, dams, and containment vessels to assist in assessing the integrity of the structures. In such images, the subsurface objects represented by such images tend to appear as distinct bright spots. In addition to referring to a foreign object that is within a medium, the term "object" also refers to any characteristic of the medium (e.g., crack in the medium and change in medium density) that is to be detected.

Using current imaging techniques, computational systems attached to arrays that contain dozens of antennas are unable to produce radar tomography images of the subsurface in real time. A real-time system needs to process the return signals from successive sampling locations of the vehicle as it travels so that, in the steady state, the return signals for one sampling location are processed within the time between samplings. Moreover, in the case of a vehicle that detects landmines, a real-time system may need to detect the presence of the landmine in time to stop the vehicle from hitting the landmine.

Once a subsurface object is detected, it can be helpful to distinguish between objects of different types or classes. For example, a GPR system may detect the presence of both landmines and large rocks that are below a roadway (e.g., in sandy soil). If the vehicle stops when any object is detected, then the vehicle would make many unneeded stops when traveling over, for example, a roadway over rocky soil or a roadway with various other non-hazardous subsurface objects (e.g., utility boxes, voids and cracks, and animal burrows). If the presence of landmines is relatively rare, then these unneeded stops may have a significant impact on the speed of detecting landmines (or other subsurface objects of interest). (The subsurface objects that are not of interest are referred to collectively as "clutter.") Moreover, if a driver needs to decide whether to stop the vehicle each time an object is detected, the driver may become complacent when the vast majority of the detected objects are not objects of interest. Some approaches for classifying landmines have been proposed. These approaches may identify landmines based on geometric features, hidden Markov models, texture analysis, spatial pattern matching, and so on. Although these approaches have had some success in distinguishing landmines from clutter, these approaches have not been able to do so in real time. By distinguishing between objects of different types or classes (e.g., objects of interest and objects not of interest), a GPR system could provide more useful information for automatically or manually responding to a detected object in real time.

SUMMARY

A method in a computing device for classifying objects is provided. The method comprises providing a classifier that identifies a class for an object, the classifier inputting a feature vector representing the object and outputting an indication of the class for the object; receiving a signal frame for a detected object, the signal frame representing return signals acquired by receivers based on signals emitted by transmitters operating in multistatic mode, the signal frame including, for each transmitter and receiver pair, a plurality of samples acquired by the receiver at different sampling times for the signal emitted by the transmitter; transforming the samples of the return signal for each transmitter and receiver pair to a return spectrum in the frequency domain; generating singular values from the samples of the return spectrum of each transmitter and receiver pair; generating a feature vector representing the detected object from the generated singular values; and applying the classifier to the generated feature vector to identify the class of the detected object. The method may also be wherein the signal frame is generated by a detection system that detects a presence of subsurface objects. The method may also be wherein the signal frame is represented as an N×N matrix where N is a number of transceivers with each element of the matrix having the samples for transmitter and receiver pairs. The method may also be wherein the transform of return signals to the return spectra applies a Fast Fourier Transform to the return signals of each transmitter and receiver pair. The method may also be wherein the return spectra include a sample for each of a plurality of frequency bands and the generating of the singular values is performed by applying a singular value decomposition to the return spectral samples of a frequency sub-band. The method may also be wherein the classifier is generated by providing training data that includes, for each of a plurality of training objects, a signal frame and a class for that training object; for each training object, generating a feature vector for that training object from the signal frame for that training object; and training the classifier based on the generated feature vectors and classes of the training objects. The method may also be wherein the classifier is selected from a group consisting of a linear classifier, a stochastic classifier, and a hybrid linear-stochastic classifier.

A computer-readable storage medium containing computer-executable instructions for controlling a computer to generate a classifier for classifying objects detected below a surface is provided. The generating is performed by a method comprising providing training data that includes, for each of a plurality of training objects, a signal frame and a class for that training object, each signal frame representing return signals acquired by receivers based on signals emitted by transmitters in multistatic mode, each signal frame including, for each transmitter and receiver pair, a plurality of samples acquired by the receiver at different sampling times for the signal emitted by the transmitter; for each training object, generating a feature vector for that training object from the signal frame for that training object by: transforming the return signal samples of each transmitter and receiver pair to return spectral samples in the frequency domain; and generating singular values for the return spectral samples of each transmitter and receiver pair; and training the classifier based on the generated feature vectors and classes of the training objects. The method may also be wherein the signal frames are generated by a detection system that detects the presence of training objects having known classes. The method may also be wherein the detection system has transmitter and receiver pairs operating in a multistatic mode. The method may also be wherein the return spectral samples include a sample for each of a plurality of frequency bands and the generating of the singular values is performed by applying a singular value decomposition to the transformed samples of a frequency sub-band. The method may also be wherein the generating of the feature vector focuses on samples of a signal frame that contribute to the detection of a training object. The method may also include after generating the feature vectors, generating a likelihood function for each class from the feature vectors, each likelihood function for a class to indicate a likelihood that a feature vector represents an object in that class; and for each training object, generating a likelihood feature vector using the generated likelihood functions, wherein the training of the classifier includes training a linear classifier based on the likelihood feature vectors and the classes of the training objects.

A computing device for classifying objects is provided. The computing device comprises a component that receives a signal frame for a detected object, the signal frame representing return signals acquired by receivers based on signals emitted by transmitters in multistatic mode, the signal frame including, for each transmitter and receiver pair, a plurality of samples acquired by the receiver at different sampling times for the signal emitted by the transmitter; a component that generates a feature vector for the detected object by transforming the return signal samples of each transmitter and receiver pair to return spectral samples in the frequency domain and generates singular values for the return spectral samples of each transmitter and receiver pair; and a component that applies a classifier to the generated feature vector to identify the class of the detected object. The computing device may also be wherein the return spectral samples include a sample for each of a plurality of frequency bands and the generating of the singular values is performed by applying a singular value decomposition to the transformed samples of a frequency sub-band. The computing device may also be wherein the component that generates the feature vector focuses on samples of the signal frame that contribute to the detection of the detected object. The computing device may also be wherein the classifier is a hybrid linear-stochastic classifier.

DETAILED DESCRIPTION

A method and system for classifying subsurface objects detected within a medium is provided. In some embodiments, a classification system classifies subsurface objects detected by a detection system based on return signals acquired by various receivers of the detection system. The return signals include samples acquired by the receivers at various sampling times after a transmitter emits a signal. The return signal acquired by a receiver thus represents a sequence of samples. The classification system represents a detected object by a feature vector that is derived from the return signals associated with the object that was detected by the detection system. The classification system applies a classifier to the feature vector to identify the class of the object represented by the feature vector. In some embodiments, the classification system generates the feature vector by transforming the return signal acquired by a receiver to a return signal spectrum in the frequency domain, for example, by applying a Fast Fourier Transform. The classification system then generates singular values from the samples of the return signal spectra associated with the receivers by, for example, applying a singular value decomposition ("SVD") to the spectral samples within each frequency band. The classification system then generates the feature vector from the generated singular values, referred to as an SVD-frequency feature vector. The classification system trains a classifier using training objects of known classes. Each training object has return signals acquired by receivers with the training objects below the surface of the medium (e.g., roadway). The classification system generates the SVD-frequency feature vectors for the training objects from their associated return signals. The classification system then trains the classifier using the SVD-frequency feature vectors and the classes of the training objects.

In some embodiments, the classification system receives the return signals from a detection system that operates in a multistatic mode by using radar return signals associated with every possible transmitter/receiver pair within an array of transmitter and receiver antennas. For example, when the detection system is used on a roadway (or more generally a track), the array of transceiver antenna pairs may be mounted on a vehicle that travels down the roadway. Each transceiver antenna pair is associated with a location across the roadway, and the transceiver antenna pairs transmit signals and receive return signals at the various sampling locations down the roadway. The detection system may pre-process return signals to suppress the effects of antenna coupling, external interference, surface bounce and multipath, and surface roughness. The classification system may use the originally acquired return signals or the pre-processed return signals to identify the class of detected object. After pre-processing the return signals, the detection system generates reconstructed images for the sampling locations. Each reconstructed image represents an image of the subsurface that extends across the medium for the length of the array of transceiver antenna pairs and to a certain depth. To generate the reconstructed images, the detection system generates a real aperture radar tomography image for each sampling location using plane-to-plane backward propagation. The detection system then generates a synthetic aperture radar image representing the reconstructed image for a sampling location based on a sequence of real aperture radar images at nearby sampling locations. The detection system then post-processes the reconstructed images to assist in improving the detection of objects. The detection system may subtract out various mean values from the pixel values of the reconstructed images, apply various filters, and enhance the energy of a spot within the reconstructed images. The detection system generates a detection statistic for each pre-processed image. For example, the detection statistic may be based on the total energy of the dominant spot within a post-processed image. The detection system considers the detection statistic as a time-varying signal with an amplitude corresponding to the time of each sampling. The peaks within the detection statistic indicate a subsurface object. The detection system then applies a peak filtering detection algorithm within the detection statistics to identify the presence of a subsurface object. Although the classification system is described primarily for processing GPR data to classify buried objects (e.g., landmines, pipes, and rocks), the classification system has many other applications, such as in the civil engineering and medical fields, and may use signals other than electromagnetic signals, such as acoustic signals.

Figure 1:
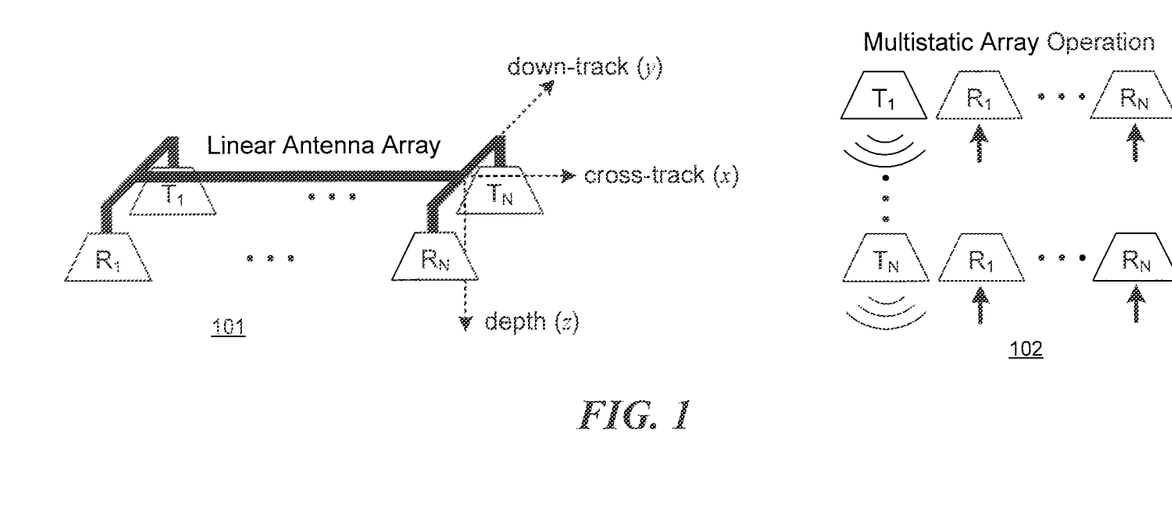
FIG. 1 is a diagram that illustrates an arrangement of a linear array of antennas.

The detection system may employ a linear array of transmitter and receiver antennas for transmitting and receiving radar signals. For example, the linear array may consist of 16 transmitters $T_i$ and 16 receivers $R_j$ with each transmitter $T_k$ and receiver $R_k$ organized into a transceiver pair. The transceivers are equally spaced across the linear array. FIG. 1 is a diagram that illustrates an arrangement of a linear array of antennas. The linear array may be moved across a stationary surface or may be stationary with the surface moving. For example, the linear array may be mounted on a vehicle that is driven on a road to detect buried objects or may be a stationary part of a medical device in which a patient is moved under the linear array. The linear array moves in a down-track (or y) direction relative to the surface, the linear array is oriented in a cross-track (or x) direction, and the linear array transmits signals in the depth (or z) direction. For example, when a linear array is mounted on a vehicle traveling on a road, the down-track is the direction of travel, the cross-track is the direction across the road, and the depth is the direction into the road. As shown in the linear array 101, the transmitter and receiver $T_iR_i$ associated with a given transceiver pair are located at substantially the same cross-track location. The linear array has two modes of operation: multi-monostatic and multistatic. In monostatic mode, the signal transmitted by a transmitter is received only by the receiver of that same transceiver. The multi-monostatic mode refers to the operation of multiple transceivers of a linear array that each operate in the monostatic mode in sequence. When in multi-monostatic mode, at each down-track or sampling location, the detection system activates the transmitters of each transceiver in sequence across the track and collects the return signal only at the corresponding receiver of that transceiver. The detection system thus collects one return signal for each transceiver at each down-track location. The multistatic mode refers to the operation of multiple transceivers of a linear array in which each transmitter transmits in sequence, but the return signal is collected by multiple receivers, generally all the receivers. When in multistatic mode, at each down-track location, the detection system activates the transmitter of each transceiver in sequence and collects the return signal from all the receivers as illustrated in diagram 102. If the linear array has N transceivers, then the detection system collects N return signals in multi-monostatic mode and $N^2$ return signals in multistatic mode. In some embodiments, the array of transceivers may not be linear or may be organized into a grid of transceivers.

Figure 2:
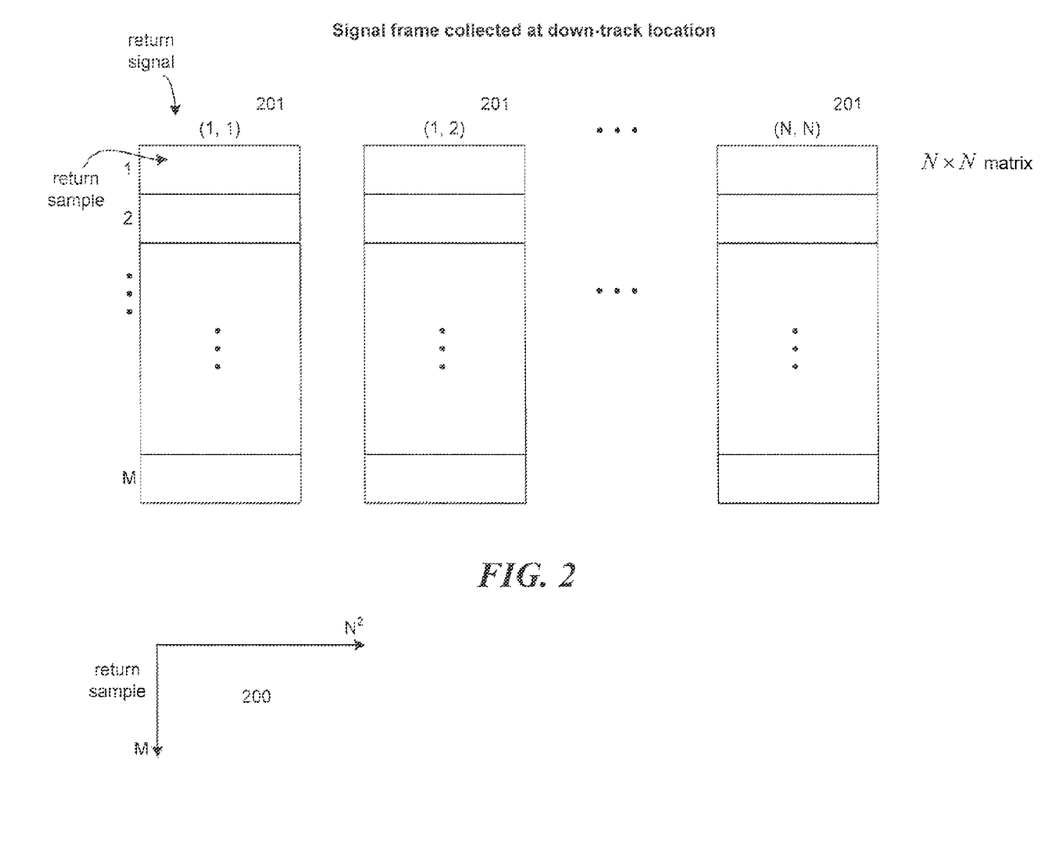
FIG. 2 is a diagram that illustrates data structures storing the return signals collected by the detection system when in multistatic mode in some embodiments.

FIG. 2 is a diagram that illustrates data structures storing the return signals acquired by a detection system when in multistatic mode in some embodiments. The data structures 201 store the quantized return signals. In operation, each transmitter emits by sending a transmit signal, and each receiver acquires a return signal for each transmitter. The receivers operate at a sampling rate and collect M return samples of the return signal per transmit signal. Each sample has a value of the amplitude of the return signal at the associated time it took for the transmitted signal to be reflected back to a receiver, so earlier collected samples may indicate reflection from the surface and later collected samples may indicate reflection off some subsurface object. The time between the transmitting of the signal and the collection of a return sample is referred to as a "fast time delay." When operating in multistatic mode and collecting the return signal from each of the N receivers, the detection system collects $M \times N^2$ samples for each down-track location as indicated by diagram 200. The return signals collected at each down-track location are referred to as a signal frame, which can be represented by an N×N matrix of return signals in which each of the $N^2$ elements is the return signal (sequence of M return samples) associated with a different transmitter and receiver pair.

Figure 3:
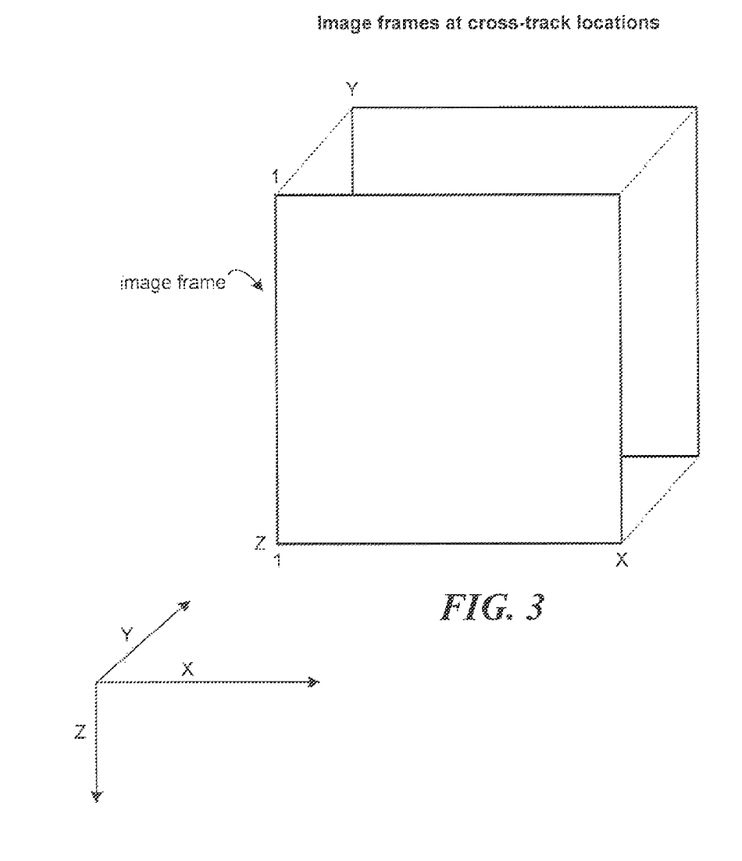
FIG. 3 is a diagram that illustrates a data structure storing the image frames generated from the return signals by the detection system in some embodiments.

FIG. 3 is a diagram that illustrates a data structure storing the image frames generated from the return signals by a detection system in some embodiments. The detection system generates an image frame of pixels for each down-track location representing a subsurface image at that down-track (or y) location that spans across the track and down to a certain depth. Each image frame thus represents an image that is the width of the track down to a prescribed depth. Each column of an image frame represents a certain cross-track location, and each row of the image frame represents a certain depth. The cross-track width divided by the number of columns X represents the cross-track resolution $\Delta_x$ of the image frame, and the prescribed depth divided by the number of rows Z represents the depth resolution $\Delta_z$ of the image frame. The detection system thus represents each image by X×Z pixels. Each image is represented as an image frame, and the value of each pixel represents the energy associated with the subsurface point at the cross-track location and the depth of the pixel at the down-track location of the image frame.

In some embodiments, the classification system receives notifications of detected objects from the detection system along with the return signal frame for the down-track location at which the object was detected. The classification system generates SVD-frequency feature vectors from signal frames in which an object was detected, and uses these vectors as the basis for representing and classifying the detected objects. Specifically, the M×1 complex-valued return spectrum associated with each of the $N^2$ M×1 real-valued return signals in the N×N array is formed by computing the discrete Fourier transform (DFT) of each return signal using a fast Fourier transform (FFT) algorithm. This results in an N×N complex-valued array at each of M frequencies. Within each of B user-designated spectral sub-bands, the classification system may average the N×N complex-valued arrays. On one extreme, there may be B=1 spectral sub-band that represents the entire spectral range. On the other extreme, there may be B=M spectral sub-bands, each representing one of the M distinct frequencies within the spectral range. The N×N averaged complex-valued arrays associated with the B designated sub-bands each have an associated singular value decomposition or SVD composed of N real non-negative singular values that can be stored as an N×1 feature vector of singular values (an SVD-frequency feature vector). Alternatively, the SVD-frequency feature vector for a specific sub-band can be derived by computing the singular values of the N×N complex matrix formed by averaging spectral samples for each matrix element within that sub-band. The classification system may form an augmented SVD-frequency feature vector by combining SVD-frequency feature vectors across B spectral sub-bands. The classification system may populate the feature vector with a subset containing only the singular values of largest magnitude or the first few singular values within each spectral sub-band. Since the singular values form an orthogonal decomposition of the data that is based on the scattering physics, the decomposition tends to partition the data into spatial groups associated with different objects in a field of view. For electromagnetic scattering, the singular values associated with a given object provide information on shape, size, and orientation.

In some embodiments, the classification system may use an SVD-power feature vector derived from a signal frame to represent a detected object. The SVD-power feature vector may be computed from the N×N complex-valued matrix associated with a specific spectral sub-band by replacing each element in the N×N matrix with its magnitude divided by the sum of magnitudes across all $N^2$ elements, and then computing singular values from the resulting N×N matrix. The power in each of the $N^2$ elements is generally proportional to the bistatic cross-section of the detected object for a specific angle of incidence and bistatic angle. The classification system uses the N×1 vector of singular values or some subset of the elements of that vector as the SVD-power feature vector for that spectral sub-band. The classification system may form an augmented SVD-power feature vector by combining SVD-power feature vectors across spectral sub-bands.

In some embodiments, the classification system may apply (1) a linear classifier, (2) a stochastic classifier, or (3) a hybrid linear-stochastic classifier to the SVD-frequency or SVD-power feature vectors x. The classification system may also apply any of a variety of well-known classifiers such as a support vector machine, a Bayesian classifier, a neural network classifier, or a k-means classifier. The classification system may apply a linear classifier, that identifies the class $C_k$ for a detected object (represented by the feature vector x) by calculating a score $y_k(x)$ for each class. This score is the dot product of a vector of weights $w_k$, ($y_k(x)=w_k \cdot x$), one vector for each class. The weight vectors are calculated during the training phase of the classification algorithm. The object (feature vector) x is assigned to class $C_k$ if the score $y_k(x)$ is a unique maximum over all other scores $y_j(x)$:j=1, 2, ..., K; and is also greater than the threshold y*≥0. When the classifier is trained, greater weights are assigned to elements of the feature vector that are more important for classification.

The classification system may apply a stochastic (e.g., maximum likelihood) classifier. The decision process is the same as for linear classification except the score is calculated using a likelihood function for class $C_k$, i.e., $y_1k(x)=p(x-1|C_1k)$.

The singular values of the feature vector are real and non-negative and will have a unimodal distribution. As such, the classification system may approximate $p(x|C_k)$ as a multivariate Gaussian distribution limited to non-negative values. The classification system may derive the mean and covariance for the likelihood function for class $C_k$ from the training data of feature vectors x for class $C_k$.

The classification system may use a hybrid linear-stochastic classifier trained on feature vectors of singular value likelihoods, as the transformation from singular values to singular value likelihoods helps prevent singular values of large magnitude from dominating the classification process. The feature vectors of singular value likelihoods may have lower or higher dimensionality than the feature vectors of singular values from which they are derived. For example, the feature vector increases in size from NB×1 to KNB×1 when each singular value is replaced by a set of K likelihoods (one for each of K object types). On the other extreme, the feature vector decreases in size to K×1 when the likelihoods for each of the K classes are averaged over all of the NB singular values. Alternatively, the feature vector changes in size from NB×1 to KB×1 when a K×1 vector of singular value likelihoods is computed for each of B sub-bands. A linear classifier (or more generally, a neural network classifier) may be trained on training sets and validation sets of feature vectors of singular value likelihoods associated with different types of objects.

When a hybrid linear-stochastic classifier is used, the classification system may model the likelihood of each singular value as a univariate function such as a log-normal density with non-negative domain for which estimates of its peak and width parameters can be readily derived from ensembles of training samples. In this case, the classification system may further define a transformed K×1 feature vector of singular value likelihoods $$\overline{p}(x) \triangleq [\overline{p}(x|C_1) \ ... \ \overline{p}(x|C_K)]'$$

as the mean of univariate likelihoods conditioned on each of the K types of objects over all elements of the SVD-feature or SVD-power feature vector x of singular values.

Figure 4:
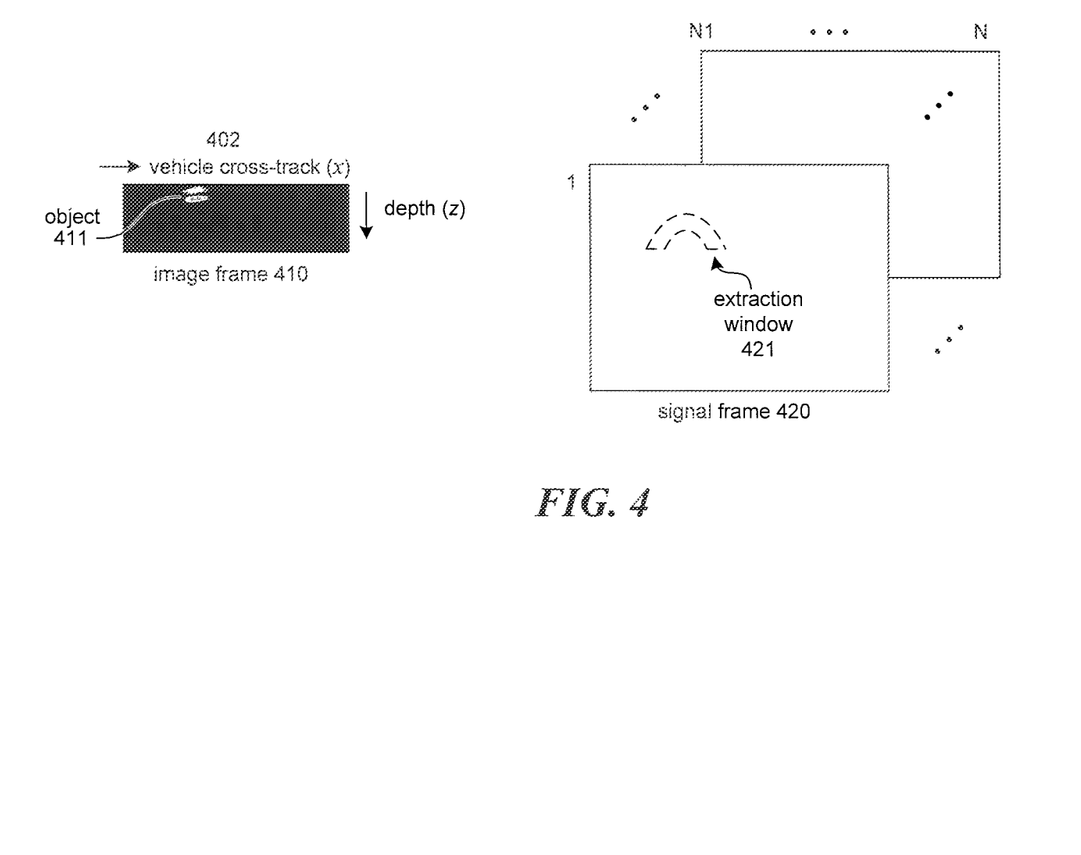
FIG. 4 is a block diagram that illustrates the portions of a signal frame that contribute to the detection of an object.

In some embodiments, the classification system may generate the SVD-frequency feature vectors by focusing on the portions of a signal frame that contributed to the detection of an object by a detection system. FIG. 4 is a block diagram that illustrates the portions of a signal frame that contribute to the detection of an object. Image frame 410 represents an image of an object 411 that may be a real aperture radar image from which the detection system detected the object. Signal frame 420 represents the return signal frames used by the detection system to generate the image frame 410. The signal frame is illustrated with a matrix for each transmitter with a row for each sample and a column for each receiver. An extraction window 421 represents the portions of each signal frame that contributed to the detection of the object (the bright spot 411 in the reconstructed image). The classification system may set the samples outside the extraction window to zero so only the samples within the extraction window may have non-zero values. When the classification system generates the SVD-frequency feature vector from such a signal frame, the result is the focusing of the feature vectors on the extraction window. Alternatively, the classification system may set the samples outside the extraction window to some non-zero value to effectively de-emphasize those samples.

Figure 5:
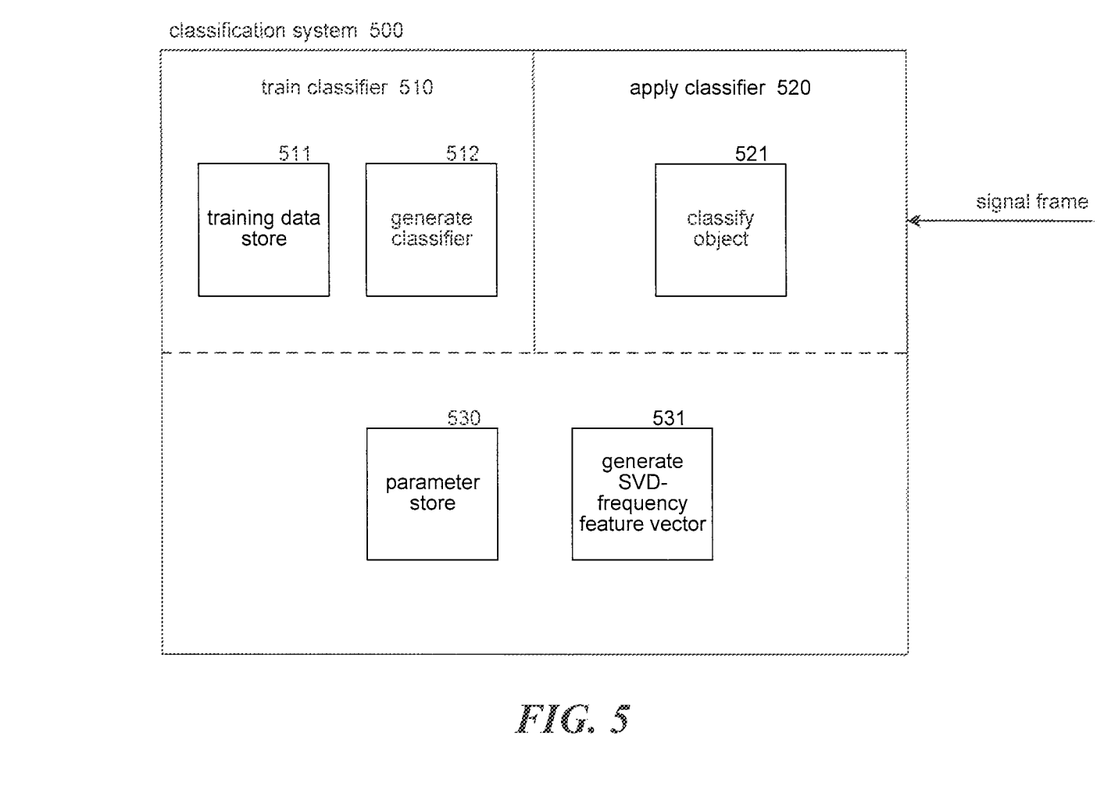
FIG. 5 is a block diagram that illustrates components of the classification system in some embodiments.

FIG. 5 is a block diagram that illustrates components of the classification system in some embodiments. The classification system 500 may include a train classifier component 510 and an apply classifier component 520. The train classifier component may include a training data store 511 and a generate classifier component 512. The apply classifier component may include a classify object component 521. The train classifier component and the apply classifier component may also share a parameter store 530 and a generate SVD-frequency feature vector component 531. The training data store contains, for each training object, the signal frame and the class of the training object. The generate SVD-frequency feature vector component generates a feature vector corresponding to a signal frame. The generate classifier component trains the classifier and stores the parameters of the classifier in the parameter store. In the case of the linear classifier, the parameters include the weights for each element of the feature vector. The classify object component generates an SVD-frequency feature vector from a signal frame for an object detected by a detection system and uses the parameters of the parameter store to classify the object.

The computing devices on which the classification system may be implemented may include a central processing unit and memory and may include input devices (e.g., keyboard and pointing devices), output devices (e.g., display devices), and storage devices (e.g., disk drives). Computer-readable media include computer-readable storage media and data transmission media. The computer-readable storage media include memory and other storage devices that may have been recorded upon or may be encoded with computer-executable instructions or logic that implement the classification system. The data transmission media is media for transmitting data using signals or carrier waves (e.g., electromagnetism) via a wire or wireless connection. Various functions of the classification system may also be implemented on devices with components that use discrete logic or logic embedded as an application-specific integrated circuit. The classification system may be implemented on a computer system that is local to a vehicle to which the linear array of antennas is mounted for processing the return signals locally. Alternatively, one or more of the components may be implemented on a computer system that is remote from the linear array. In such an alternative, the data used by the various components (e.g., return signals and image frames) may be transmitted between the local computing system and remote computer system and between remote computing systems.

The classification system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 6:
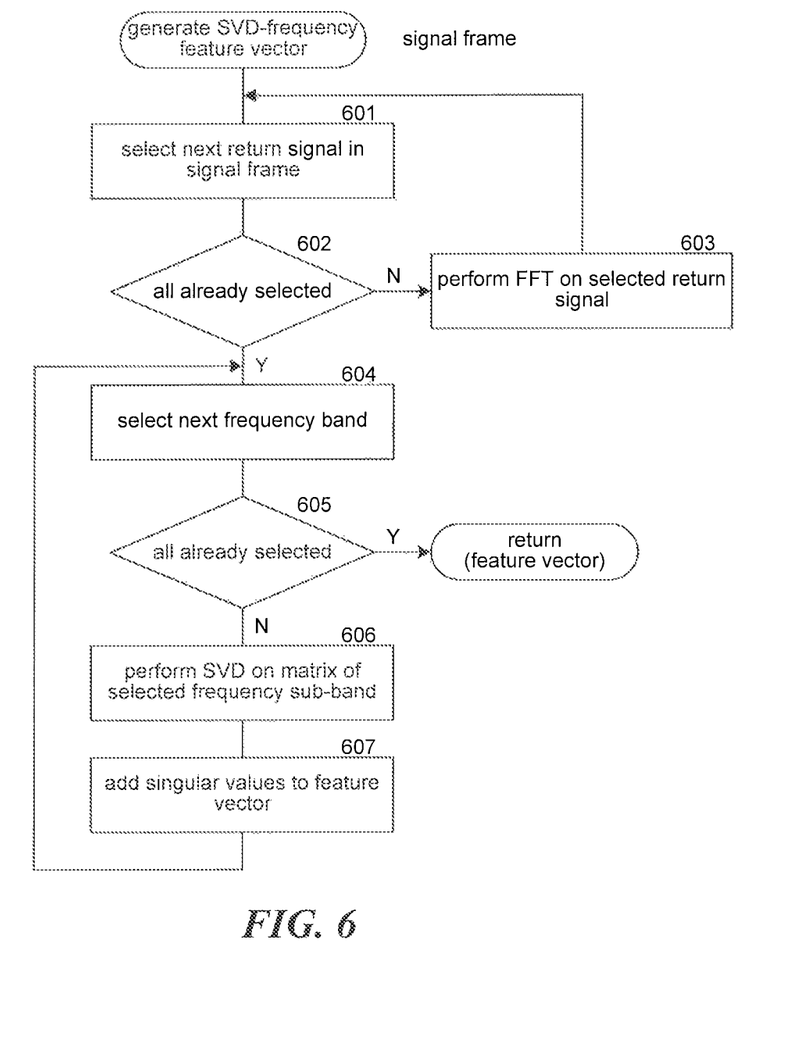
FIG. 6 is a flow diagram that illustrates the processing of a "generate SVD-frequency feature vector" component of the classification system in some embodiments.

FIG. 6 is a flow diagram that illustrates the processing of a "generate SVD-frequency feature vector" component of the classification system in some embodiments. The component is passed a signal frame and returns an SVD-frequency feature vector derived from the signal frame. In block 601, the component selects the next return signal of the signal frame. In decision block 602, if all the elements have already been selected, then the component continues at block 604, else the component continues at block 603. In block 603, the component performs a Fast Fourier Transform on the selected return signal and then loops to block 601 to select the next return signal from the signal frame. In blocks 604-607, the component generates the singular values for the matrix of each frequency sub-band. In block 604, the component selects the next frequency sub-band. In decision block 605, if all the frequency sub-bands have already been selected, then the component returns the feature vector, else the component continues at block 606. In block 606, the component performs the SVD on the matrix of the selected frequency sub-band. In block 607, the component adds the singular values identified by the SVD to the SVD-frequency feature vector and then loops to block 604 to select the next frequency sub-band. In some embodiments, the component may add all the singular values to the feature vector or a subset of the singular values. In addition, the component may add singular values for only certain frequency sub-bands to the feature vector.

Figure 7:
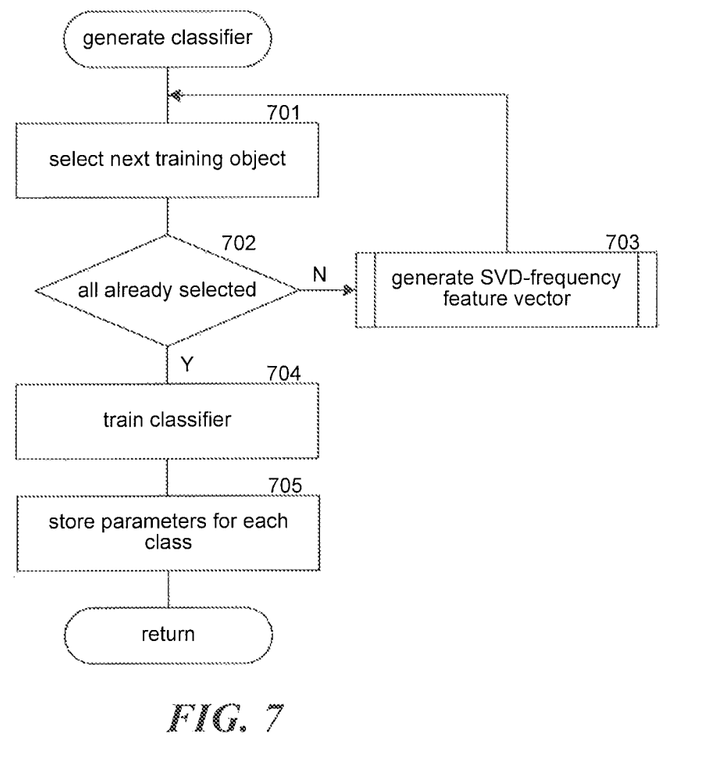
FIG. 7 is a flow diagram that illustrates the processing of a "generate classifier" component of the classification system in some embodiments.

FIG. 7 is a flow diagram that illustrates the processing of a "generate classifier" component of the classification system in some embodiments. The component generates the SVD-frequency feature vector for each training object and then trains the classifier using those feature vectors and the classes of the objects. In block 701, the component selects the next training object. In decision block 702, if all the training objects have already been selected, then the component continues at block 704, else the component continues at block 703. In block 703, the component invokes the generate SVD-frequency feature vector component to generate the feature vector for the selected training object and then loops to block 701 to select the next training object. In block 704, the component trains the classifier to learn the parameters for classification. In block 705, the component stores the parameters for each class in the parameter store and then returns.

Figure 8:
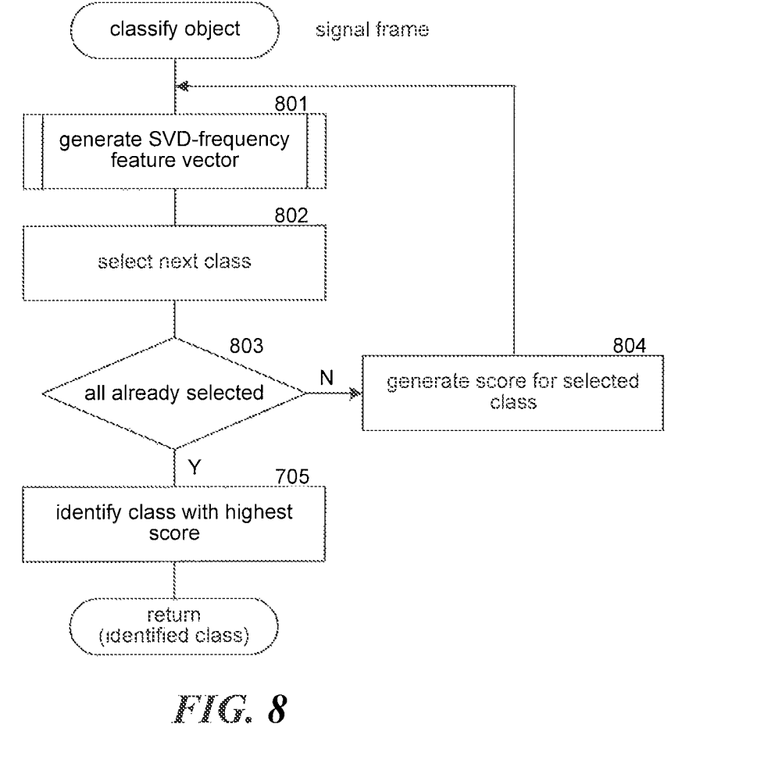
FIG. 8 is a flow diagram that illustrates the processing of a "classify object" component of the classification system in some embodiments.

FIG. 8 is a flow diagram that illustrates the processing of a "classify object" component of the classification system in some embodiments. The component is passed a signal frame for a detected object and returns an indication of a class of the detected object. In block 801, the component invokes the generate SVD-frequency feature vector component to generate the feature vector for the signal frame. In block 802, the component selects the next class. In decision block 803, if all the classes have already been selected, then the component continues at block 805, else the component continues at block 804. In block 804, the component generates a score for the selected class using the parameters of the parameter store and the SVD-frequency feature vector and then loops to block 802 to select the next class. In block 805, the component identifies the class with the highest score and returns that identified class as the class of the detected object represented by the signal frame.

Figure 9:
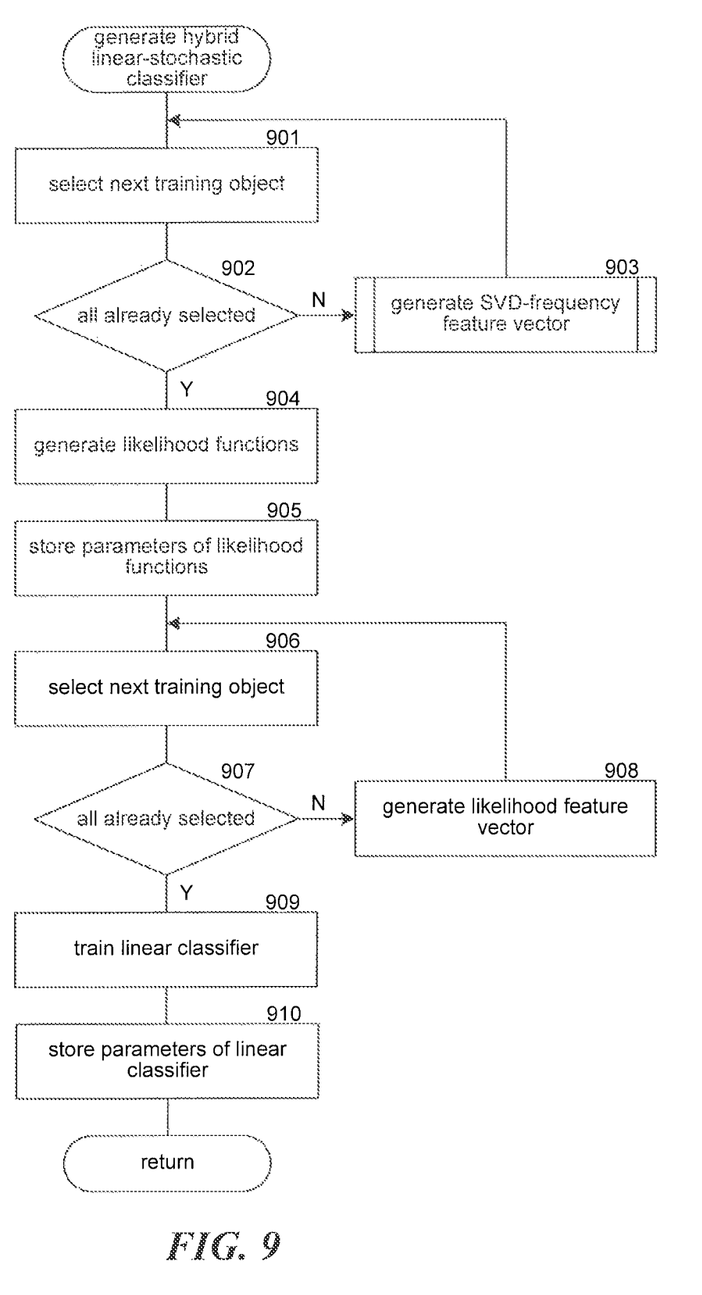
FIG. 9 is a flow diagram that illustrates the processing of a "generate hybrid linear-stochastic classifier" component of the classification system in some embodiments.

FIG. 9 is a flow diagram that illustrates the processing of a "generate hybrid linear-stochastic classifier" component of the classification system in some embodiments. The component generates likelihood feature vectors for training objects from likelihood functions and then trains a linear classifier using the likelihood feature vectors. In block 901, the component selects the next training object. In decision block 902, if all the training objects have already been selected, then the component continues at block 904, else the component continues at block 903. In block 903, the component invokes the generate SVD-frequency feature vector component to generate the feature vector for the selected training object and then loops to block 901 to select the next training object. In block 904, the component generates one or more likelihood functions for each class. In block 905, the component stores the parameters (e.g., mean and covariance) of each likelihood function. In block 906, the component selects the next training object In decision block 907, if all the training objects have already been selected, then the component continues at block 909, else the component continues at block 908. In block 908, the component generates a likelihood feature vector that contains a likelihood for each class that is generated by the likelihood functions applied to the SVD-frequency feature vector for the selected training object. The component than loops to block 906 to select the next training object. In block 909, the component trains a linear classifier using the likelihood feature vectors and the classes of the training objects. In block 910, the component stores the parameters of the linear classifier and then returns.

Figure 10:
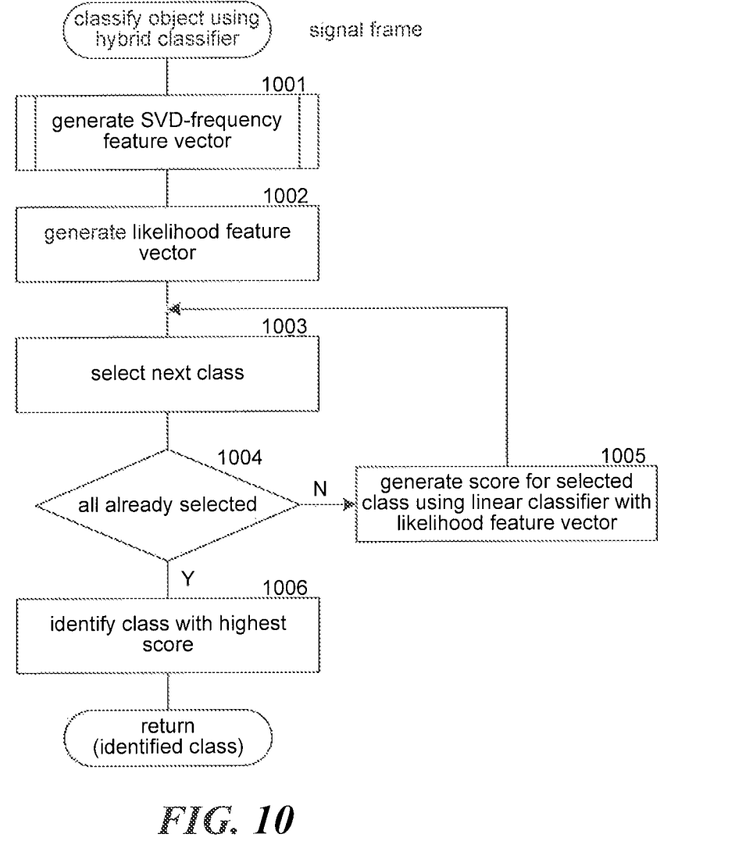
FIG. 10 is a flow diagram that illustrates the processing of a "classify object using a hybrid classifier" component of the classification system in some embodiments.

FIG. 10 is a flow diagram that illustrates the processing of a "classify object using a hybrid classifier" component of the classification system in some embodiments. The component is passed a signal frame and outputs an indication of the class of the object represented by the signal frame. In block 1001, the component invokes the "generate SVD-frequency feature vector" component to generate the feature vector for the signal frame. In block 1002, the component generates a likelihood feature vector based on the SVD-frequency feature vectors using the likelihood functions. In block 1003, the component selects the next class. In decision block 1004, if all the classes have already been selected, then the component continues at block 1006, else the component continues at block 1005. In block 1005, the component generates a score for the selected class using a linear classifier and the likelihood feature vector and then loops to block 1003 to select the next class. In block 1006, the component identifies a class with the highest score and returns that identified class as the class of the object represented by the signal frame.

From the foregoing, it will be appreciated that specific embodiments of the invention have been described herein for purposes of illustration but that various modifications may be made without deviating from the scope of the invention. For example, the classification system may be used to classify objects detected by various detection systems. One suitable detection system is described in U.S. patent application Ser. No. 13/219,410, entitled "REAL-TIME SYSTEM FOR IMAGING AND OBJECT DETECTION WITH A MULTI-STATIC GPR ARRAY," which is being filed concurrently and is hereby incorporated by reference. Accordingly, the invention is not limited except as by the appended claims.

We claim:

1. A method in a computing device for classifying objects, the method comprising:
   providing a classifier that identifies a class for an object, the classifier inputting a feature vector representing the object and outputting an indication of the class for the object;
   receiving a signal frame for a detected object, the signal frame representing return signals acquired by receivers based on signals emitted by transmitters operating in multistatic mode, the signal frame including, for each transmitter and receiver pair, a plurality of samples acquired by the receiver at different sampling times for the signal emitted by the transmitter;
   transforming the samples of the return signal for each transmitter and receiver pair to a return spectrum in the frequency domain;
   generating singular values from the samples of the return spectrum of each transmitter and receiver pair;
   generating a feature vector representing the detected object from the generated singular values; and
   applying the classifier to the generated feature vector to identify the class of the detected object.

2. The method of claim 1 wherein the signal frame is generated by a detection system that detects a presence of subsurface objects.

3. The method of claim 1 wherein the signal frame is represented as an N×N matrix where N is a number of transceivers with each element of the matrix having the samples for transmitter and receiver pairs.

4. The method of claim 1 wherein the transform of return signals to the return spectra applies a Fast Fourier Transform to the return signals of each transmitter and receiver pair.

5. The method of claim 1 wherein the return spectra include a sample for each of a plurality of frequency bands and the generating of the singular values is performed by applying a singular value decomposition to the return spectral samples of a frequency sub-band.

6. The method of claim 1 wherein the classifier is generated by:
   providing training data that includes, for each of a plurality of training objects, a signal frame and a class for that training object;
   for each training object, generating a feature vector for that training object from the signal frame for that training object; and
   training the classifier based on the generated feature vectors and classes of the training objects.

7. The method of claim 1 wherein the classifier is selected from a group consisting of a linear classifier, a stochastic classifier, and a hybrid linear-stochastic classifier.

8. A computer-readable storage medium containing computer-executable instructions for controlling a computer to generate a classifier for classifying objects detected below a surface, by a method comprising:
   providing training data that includes, for each of a plurality of training objects, a signal frame and a class for that training object, each signal frame representing return signals acquired by receivers based on signals emitted by transmitters in multistatic mode, each signal frame including, for each transmitter and receiver pair, a plurality of samples acquired by the receiver at different sampling times for the signal emitted by the transmitter;

for each training object, generating a feature vector for that training object from the signal frame for that training object by:

transforming the return signal samples of each transmitter and receiver pair to return spectral samples in the frequency domain; and generating singular values for the return spectral samples of each transmitter and receiver pair; and training the classifier based on the generated feature vectors and classes of the training objects.

9. The computer-readable storage medium of claim 8 wherein the signal frames are generated by a detection system that detects the presence of training objects having known classes.

10. The computer-readable storage medium of claim 9 wherein the detection system has transmitter and receiver pairs operating in a multistatic mode.

11. The computer-readable storage medium of claim 8 wherein the return spectral samples include a sample for each of a plurality of frequency bands and the generating of the singular values is performed by applying a singular value decomposition to the transformed samples of a frequency sub-band.

12. The computer-readable storage medium of claim 8 wherein the generating of the feature vector focuses on samples of a signal frame that contribute to the detection of a training object.

13. The computer-readable storage medium of claim 8 including:

after generating the feature vectors, generating a likelihood function for each class from the feature vectors, each likelihood function for a class to indicate a likelihood that a feature vector represents an object in that class; and for each training object, generating a likelihood feature vector using the generated likelihood functions, wherein the training of the classifier includes training a linear classifier based on the likelihood feature vectors and the classes of the training objects.

14. A computing device for classifying objects, the computing device comprising:

a component that receives a signal frame for a detected object, the signal frame representing return signals acquired by receivers based on signals emitted by transmitters in multistatic mode, the signal frame including, for each transmitter and receiver pair, a plurality of samples acquired by the receiver at different sampling times for the signal emitted by the transmitter;

a component that generates a feature vector for the detected object by transforming the return signal samples of each transmitter and receiver pair to return spectral samples in the frequency domain and generates singular values for the return spectral samples of each transmitter and receiver pair; and a component that applies a classifier to the generated feature vector to identify the class of the detected object.

15. The computing device of claim 14 wherein the return spectral samples include a sample for each of a plurality of frequency bands and the generating of the singular values is performed by applying a singular value decomposition to the transformed samples of a frequency sub-band.

16. The computing device of claim 14 wherein the component that generates the feature vector focuses on samples of the signal frame that contribute to the detection of the detected object.

17. The computing device of claim 14 wherein the classifier is a hybrid linear-stochastic classifier.

\* \* \* \* \*